United States Patent [19]
Camacho

[11] 3,757,628
[45] Sept. 11, 1973

[54] FIXTURE FOR SAW
[76] Inventor: George T. Camacho, 443 E. 31st St., Tucson, Ariz. 85713
[22] Filed: May 1, 1972
[21] Appl. No.: 249,357

[52] U.S. Cl. ..................... 83/745, 83/471.2, 83/648
[51] Int. Cl. ........................... B27b 9/04, B27b 5/20
[58] Field of Search ............... 83/745, 471.3, 471.2, 83/522, 648

[56] References Cited
UNITED STATES PATENTS
| | | | |
|---|---|---|---|
| 2,773,523 | 12/1956 | Hopla | 83/745 |
| 2,655,956 | 10/1953 | Taylor | 83/745 |
| 2,823,709 | 2/1958 | Koneczka | 83/745 |
| 2,876,808 | 3/1959 | Lindheim | 83/471.3 |

Primary Examiner—Donald R. Schran
Attorney—James A. Eyster

[57] ABSTRACT

An adjustable box having open sides and expandable ends is slipped over the end of a rafter which is to be cut to length. After the box is placed it is clamped to the rafter. The box carries an adjustable angle plate to which is fastened a tube. A bar sliding in this tube is secured at its ends to a second, parallel, bar which in turn carries a second sliding tube. This second tube has provision for fastening to a portable electric circular saw. After the fixture has been clamped to a rafter and set at the required angle and to the place marked for cutting, the attached saw is started and pushed through the rafter, cutting it off. Thus any requirement for scribing and following a cutting line is eliminated.

4 Claims, 3 Drawing Figures

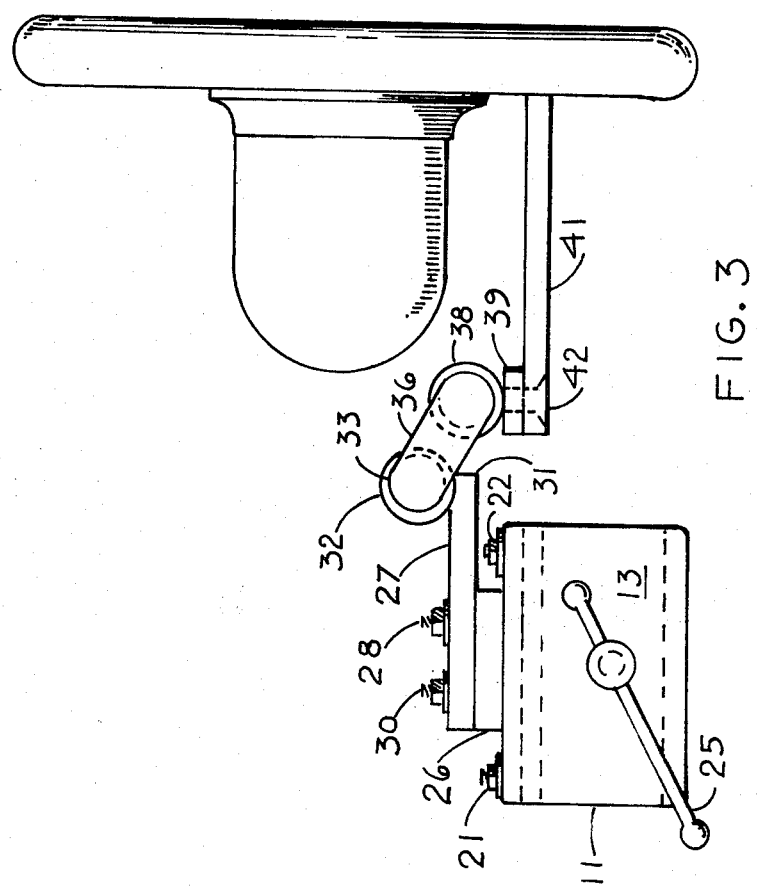

FIXTURE FOR SAW

BACKGROUND OF THE INVENTION

This invention relates to portable circular saws, and particularly to fixtures for use with such saws.

Portable electric circular saws are in wide use by carpenters in building houses, in fact, such saws have almost completely displaced hand saws in cutting lumber.

One use to which such saws are put is in the construction of a wood frame gable roof for a dwelling. In such a roof, rafters stretch from the ridge board to the top plate of the wall and beyond. They are, when put in place, of random and excess length. They are then sawn to the proper length, with the ends cut to the required angle.

Commonly, the way in which this is now done, after all rafters have been laid and secured on one side of the gable, is to stretch a chalk line along the ends of all of the rafters and snap it, marking all rafters at the points where they are to be cut. On each rafter a square or protractor is then laid and a line is drawn where that rafter is to be cut. A portable circular saw is then used to cut off the end of the rafter, following the line drawn on it.

In many cases this procedure is easy to follow and the result is satisfactory; however, in many other cases the line on the rafter is hard to follow and the result may not be satisfactory. This may be because the rafter has to be cut from below, and the carpenter has to look up into the bright sky or even into the sun, making it difficult or impossible to follow the line with his saw.

SUMMARY OF THE INVENTION

The present invention provides a fixture which facilitates this operation of cutting a rafter to the required length. The fixture comprises an adjustable box or frame which fits over the end of a rafter. To the box there is jointed a plate bolted to a portable circular saw. This joint includes a slide which allows the saw to be brought to the rafter and to cut through it at an angle determined by the angular setting of the fixture.

In using this fixture, it is set to the required cutting angle, then clamped to the rafter at the mark made by the chalked snap line. The carpenter then pushes the saw through the rafter. This eliminates the need for inscribing a line across the rafter to be followed by the saw. Thus any necessity for skill in cutting to a line, and indeed any requirement for skill or any particular care in cutting, are completely eliminated by the use of this fixture.

One object of this invention is to provide a semi-automatic means for cutting a piece of lumber to a required length and at a required angle.

Another object is to provide a fixture for cutting the end of a piece of wood to a preset angle.

Still another object is to provide a fixture for use with a portable circular saw to cut installed rafters to a required length and at a required angle.

Yet another object is to provide a fixture for use with a machine saw for cutting a bar or rod of any material to a prescribed length and angle.

BRIEF DESCRIPTION OF THE DRAWING

FIG. 3 is an end view of the fixture, with saw attached.

DESCRIPTION OF THE PREFERRED EMBODIMENT

Figure 1:
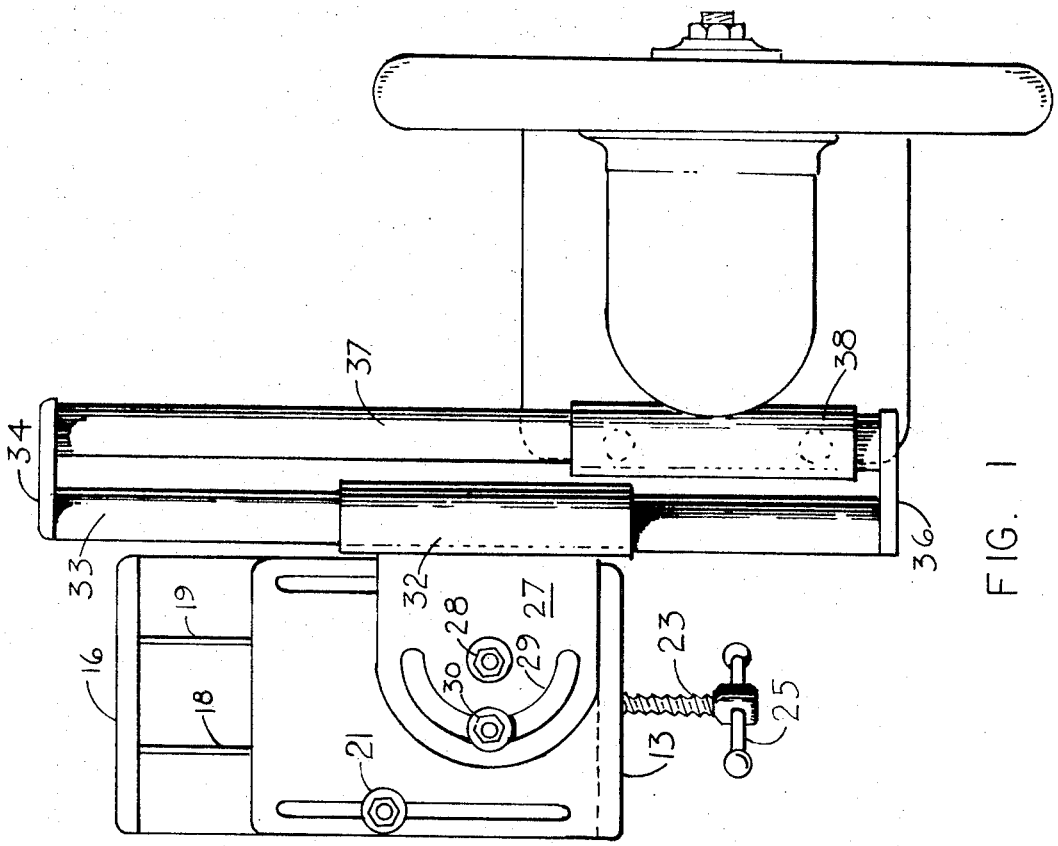
FIG. 1 is a top plan view of the fixture, with portable saw attached.

Referring now to the figures, an adjustable box having open sides and bottom comprises two components, 11 and 12. Each component consists principally of an L-shaped part with a turned-up lip. Component 11 thus comprises an end 13, top leaf 14 and lip 15. Component 12 comprises an end 16, lip 20 and top leaf 17. The top leaf 14 slides on top leaf 17, being held to motion parallel to top leaf 17 by two splines, 18 and 19, in top leaf 17 matching two grooves in top leaf 14. Thus the two components of the box can be telescoped together.

Figure 2:
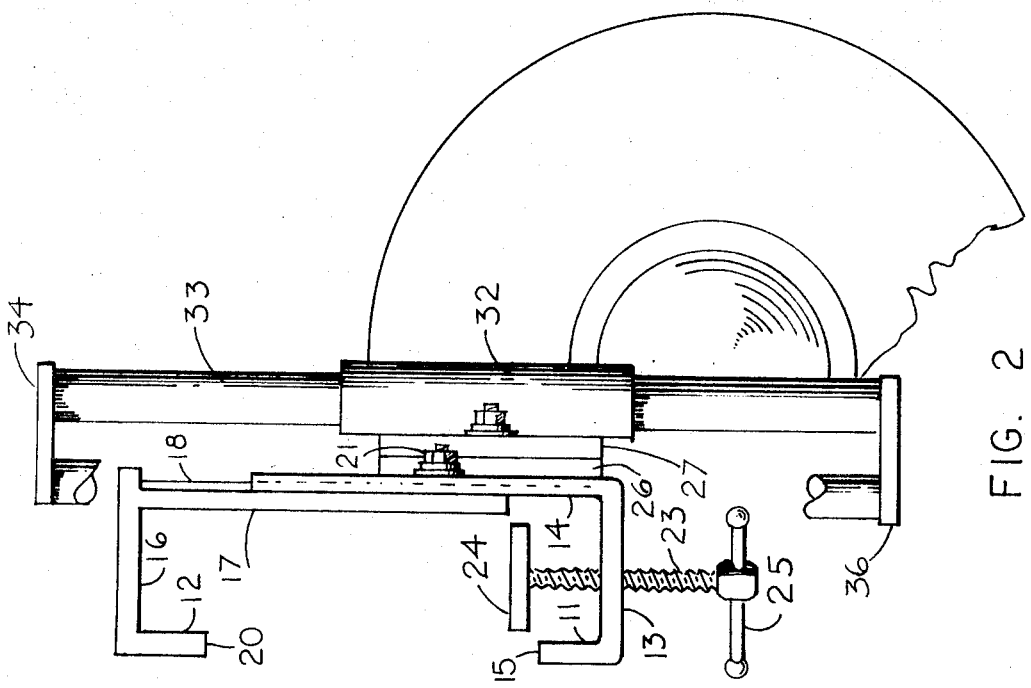
FIG. 2 is a side view of the fixture.

The two parts 11 and 12 are held together by two bolts, one of which, 21, is visible in FIGS. 1, 2, and 3, and the other of which, 22, is visible in FIG. 3 only. A clamp is composed of threaded rod 23, pad 24, a threaded hole for the rod in the end member 13 of part 11, and a crossbar handle 25.

The function of this adjustable box is, after being slipped over the end of a rafter and the clamp tightened, to embrace and hold a rafter securely, providing a solid anchorage for the fixture on the rafter to be cut.

A spacer plate 26 is permanently secured to the upper surface of the top leaf 14 of box part 11. To this spacer plate 26 is secured an angle plate 27 by means of a bolt 28. The angle plate or turntable 27 can thus rotate or swivel about bolt 28. Angle plate 27 is provided with a semicircular slot 29. A bolt 30 projects upward through slot 29 and is provided with a washer and nut. The edge 31 of plate 27 is straight and to it is secured a tube 32. A bar 33 is a running fit in tube 32. This bar 33 is secured by ends 34 and 36 to a second bar 37, which may be identical with bar 33 and is here so depicted, but need not be. Bar 37 is provided with a tube 38 which is a running fit on bar 37. A plate 39 is secured to tube 38.

The elements so far described constitute the main elements of the fixture. They are preferably made of metal, for example, steel.

The sole plate 41 of a portable electric circular saw is secured to the plate 39, preferably by two countersunk, flat-headed screws, one of which, 42, is shown dotted.

In the use of this fixture and its connected saw, the bolts 21 and 22 are loosened and the box components, 11 and 12, are slid apart until the box can be slid over the end of a rafter to be cut. The bolts 21 and 22 are then tightened. The bolt 30 is now loosened and the angle plate 27 is rotated to the desired angle of cut, carrying with it, as it is rotated, the bars 33 and 37 and the circular saw secured to tube 38. Bolt 30 is now tightened. The box is now slid along the rafter until the saw blade is at the place where the cut is to be made, and the clamp screw 23 is tightened, clamping the fixture to the rafter. The saw is now started and pushed through the rafter, the tubes 32 and 38 sliding on the bars 33 and 37.

What is claimed is:

1. The combination of a portable circular saw and a fixture for cutting an elongated work piece comprising:
   an adjustable telescoping box having open sides and bottom comprising:

a pair of L-shaped parts, each having an end and a top leaf, said top leaves sliding one on the other, guided to parallel motion by a spline in one and a matching groove in the other;

means locking said two top leaves together in any selected relative position;

a screw clamp in one said end for clamping said box to said work piece;

a turntable pivoted to one said top leaf and lockable at any selected angle;

double hinged sliding means secured to said adjustable telescoping box comprising:

a first bar;

a second bar;

means at the ends of said first and second bars fastening them rigidly together in side-by-side and parallel relative position;

a first tube slideable and rotatable on said first bar and secured rigidly to said turntable;

a second tube slideable and rotatable on said second bar; and a portable circular saw secured rigidly to said second tube.

2. The combination of a circular saw and a fixture for cutting a work piece comprising:

clamp means for securing said fixture to said work piece;

adjustable swivel means on said clamp piece;

hinged sliding means comprising:

a first bar;

a second bar;

means fastening said first and second bars together at their ends in side-by-side and parallel positions;

means sliding on said first bar and also hinging it to said adjustable swivel means; and means sliding on said second bar and also hinging it to said circular saw.

3. The combination of a circular saw and a fixture for cutting a work piece comprising:

an adjustable, telescoping box having open sides and partly open bottom and having a screw clamp in one end, whereby the box can be slid over the end of a plank work piece and secured thereto at a desired location;

adjustable swivel means on said box;

hinged sliding means secured to said adjustable swivel means; and means securing said circular saw to said hinged sliding means.

4. The combination in accordance with claim 3 in which:

said box comprises a pair of similar parts sliding together, each of said pair comprising a top leaf, an end and a lip, one top leaf sliding on the other top leaf guided by at least one spline and groove; and means locking said pair together.

* * * * *